INVENTOR.
WILLIAM C. SUSOR
BY
Thomas H. Grafton
ATTORNEY

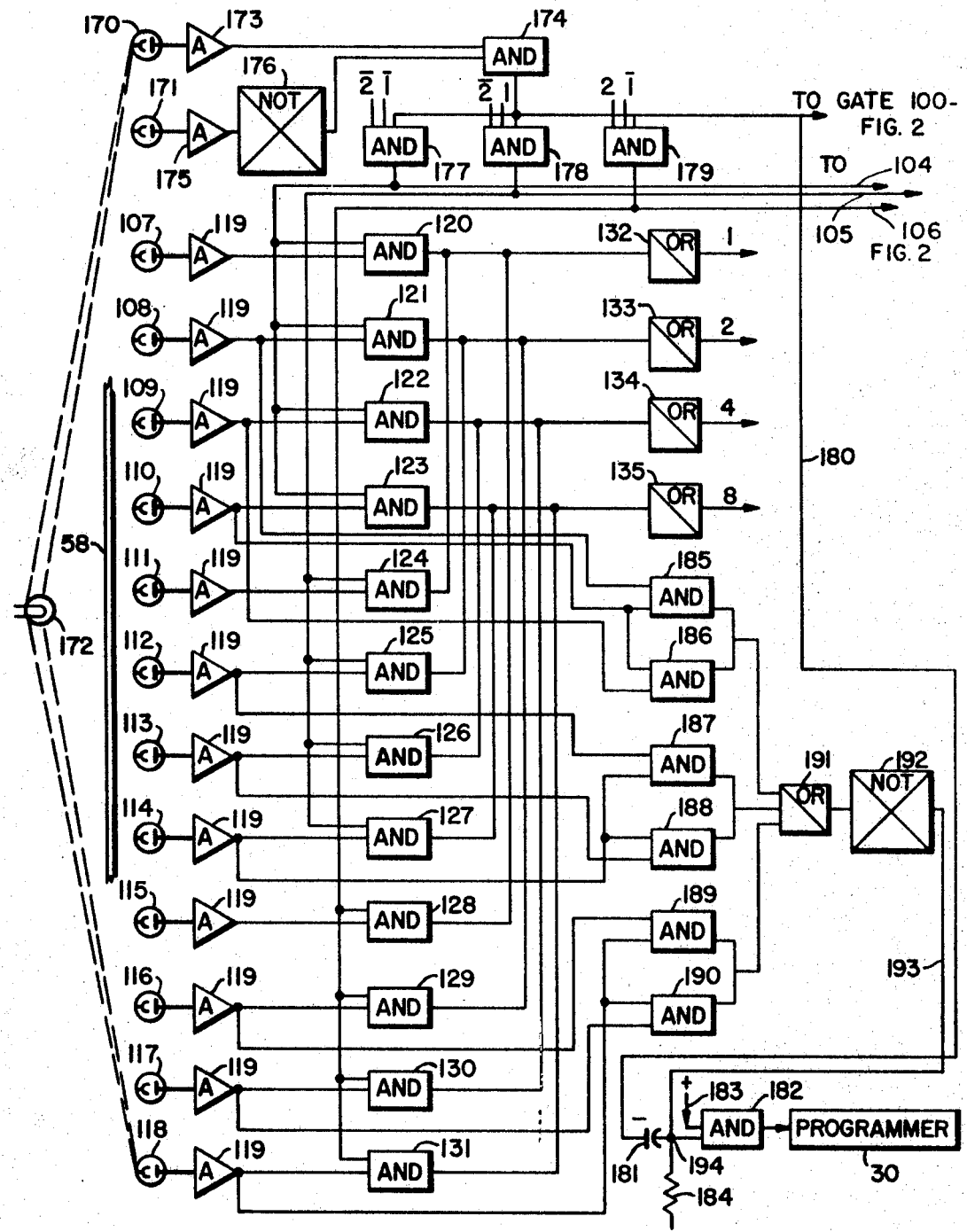

United States Patent Office 3,459,272
Patented Aug. 5, 1969

3,459,272
CONDITION RESPONSIVE APPARATUS
William C. Susor, Oregon, Ohio, assignor, by mesne assignments, to The Reliance Electric and Engineering Company, Toledo, Ohio, a corporation of Ohio
Filed Mar. 21, 1966, Ser. No. 535,760
Int. Cl. G01g 23/28
U.S. Cl. 177—4
8 Claims

ABSTRACT OF THE DISCLOSURE

An automatic computing weighing scale having printing plates for printing commodity names and also for activating photosensitive means by permitting light to fall on such means in accordance with the unit prices of the respective commodity names. The activated photosensitive means inserts unit price into the computer of the scale.

---

This invention relates to computing weighing scales and more particularly to improved techniques for setting up selected price factors in the computers of such weighing scales.

Heretofore, in electrical computing weighing scales, the selected price factors have been set up in the computers by means of manually operated selector switches as disclosed in U.S. application Ser. No. 439,751, filed Mar. 15, 1965 in the name of William C. Susor or by commodity name printing plate-operated selector switches as disclosed in U.S. Patent No. Re. 25,897, issued Nov. 9, 1965 in the name of Robert E. Bell. The computer computes the value of a package of goods according to the weight of that particular package and the arbitrarily selected price factor, i.e., the price per unit of weight of the material, and the scale prints a ticket, label or the like bearing such computer value and selected price together with the net weight, date, store code, commodity name, and commodity grade.

The objects of this invention are to improve computing weighing scales, to simplify the operation of such scales, to improve the techniques of setting up the selected price factors in the computers of such scales, and to provide several interlocks guarding against improper operation in such scales in the event that a light source fails or an attempt is made to set up a place in the selected price factor in excess of a predetermined number or in the absence of a printing plate which prints the commodity name.

One embodiment of this invention enabling the realization of these objects is the computing weighing scale disclosed in the above U.S. application Ser. No. 439,751 modified to have the selected price factors entered into the computer either by the manually operated selector switches shown in the application in a first mode of operation or by novel photosensitive means in a second mode of operation. The mode of operation is selected automatically by the type of commodity name printing plate inserted in the scale. There are two types of commodity name printing plates, one such as is used in the computer described in the above U.S. application Ser. No. 439,751 for printing the commodity name only (selected price set up by manually operated switches), and the other defining openings with readily removable masks covering selected openings in a pattern according to the selected price factor and being both for masking the photosensitive means from its light source to operate the photosensitive means according to the pattern and for printing the commodity name. Computing is prevented or interrupted if the light source fails or if an attempt is made to set up a place in the selected price factor in excess of a predetermined number or if a commodity name printing plate is not in operative position.

In accordance with the above, one feature of this invention resides in entreing the selected price factor in the computer by means of the photosensitive means.

Other features reside in the interlocks which prevent improper operation and in the automatic selection of the mode of operation as described above.

The above and other objects and features of this invention will be appreciated more fully from the following detailed description when read with reference to the accompanying drawings wherein:

FIG. 5 is a block diagram showing how the photocells illustrated in FIG. 3 are in circuit with the computer and the programmer shown in FIG. 1.

Figure 1:
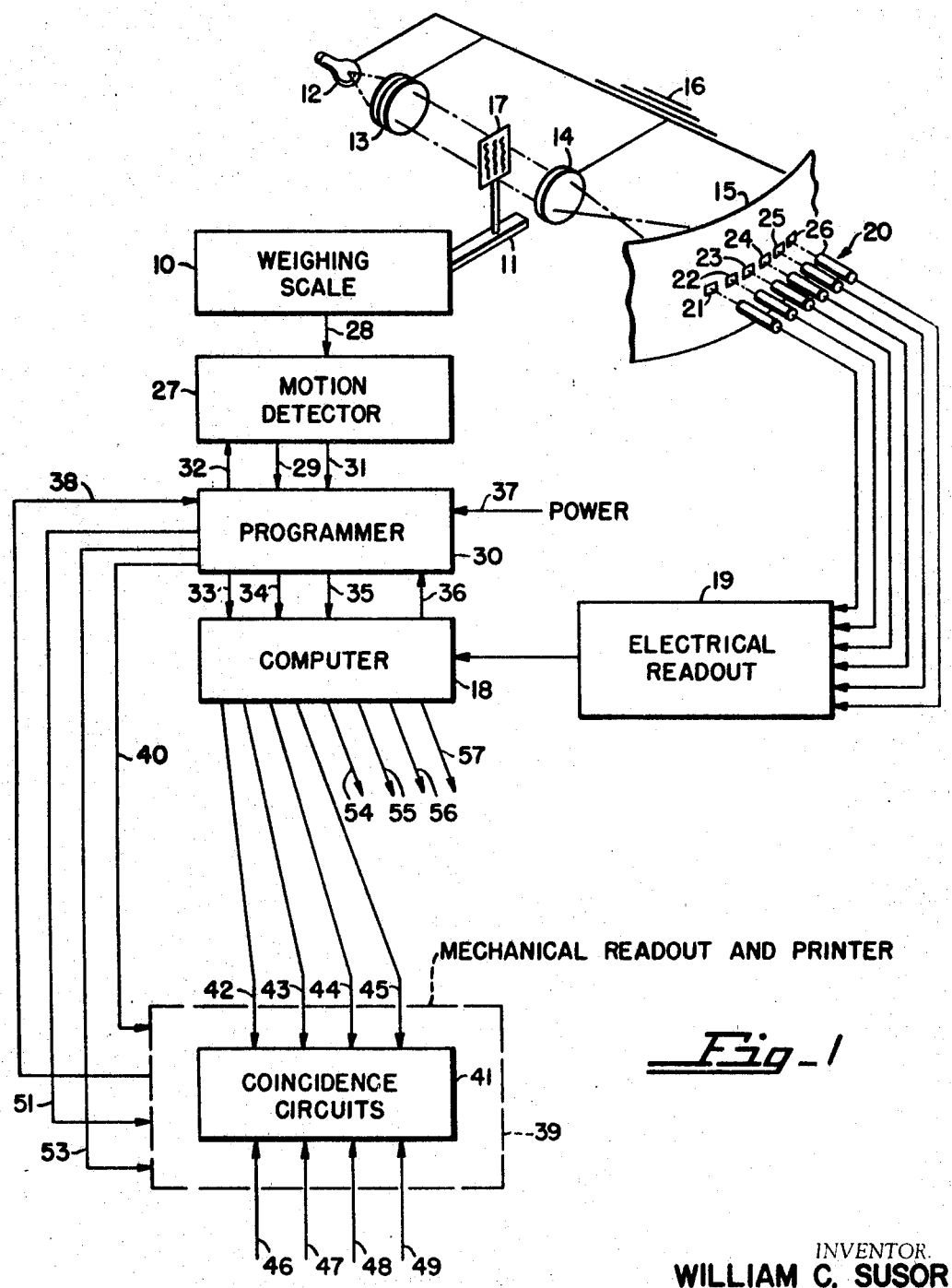
FIG. 1 is a schematic diagram illustrating the general organization of an electrical weighing, computing and printing system with the photosensitive means of the invention for setting up selected unit price factors in the computer combined therewith.

Referring to FIG. 1, a computing weighing scale 10 includes a lever 11 and an optical projection system which diagramamtically includes a light source 12, a condensing lens 13, a projection lens 14 and a photocell mask 15. The light source 12, the lenses 13 and 14, and the mask 15 are connected to ground as shown at 16 (e.g., base of weighing scale, the mask 15 being rigidly mounted with respect to the projection optics. A coded chart 17 is moved by the load-responsive lever 11 in the optical projection system, the chart 17, hence, being condition responsive. The computer 18 which is disclosed in the above U.S. application Ser. No. 439,751 receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1–2–4–8 binary coded decimal output of an eletcriĉal readout 19 in circuit therewith.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 which prevents erroneous weight readouts from taking place when the weighing mechanism is in motion. The motion detector 27 applies no motion signals through a lead 29 to a programmer 30 which is disclosed in U.S. Patent No. 3,384,193 issued May 21, 1968 in the names of W. C. Susor and O. J. Martin. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the read out positions of the number wheels in a mechanical readout and printer 39 agree. The programmer 30 also applies a signal through a lead 40 to the mechanical readout and printer 39 commanding it to print.

The programmer 30 is used in conjunction with a mechanical readout which is disclosed in U.S. application Ser. No. 416,526, filed Dec. 7, 1964, in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1–2–4–8 binary coded unit price signals from the computer 18 through leads 42–45 and 1–2–4–8 binary coded decimal signals through leads 46–49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1–2–4–8 binary coded value signals from the computer 18 through leads 54–57 and 1–2–4–8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter are of conventional type.

Figure 3:
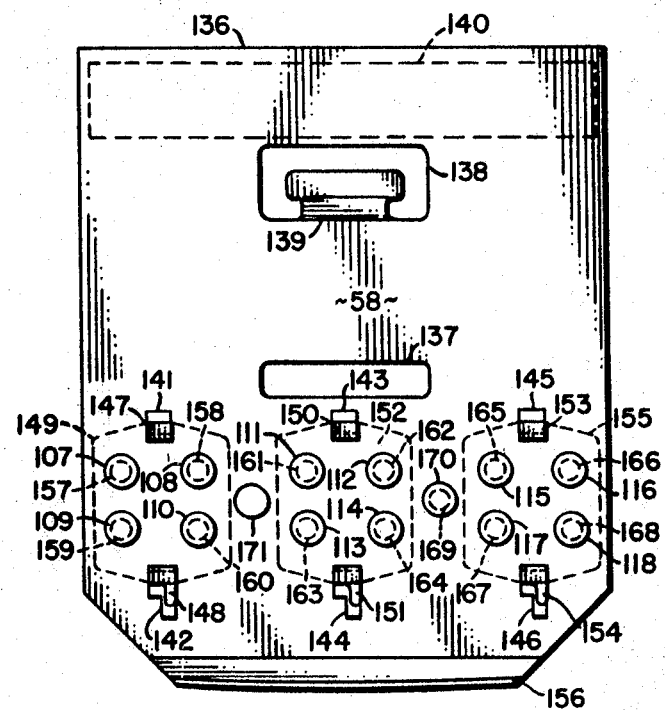
FIG. 3 is a plan view of a commodity name printing plate defining openings with masks covering selected openings in a pattern according to a selected price factor and in combination with photocells which are operated by the plate in accordance with the pattern.

The mechanical readout is used in conjunction with a printer which is disclosed in U.S. Patent No. 3,334,583 issued Aug. 8, 1967 in the name of Clarence E. Adler. The printer includes a commodity name printing plate which is similar in its printing function to the printing plate 58 of the invention (FIGS. 3 and 5).

The computer 18 includes a price entry section 59 (FIG. 2) having a two-stage flip flop 61 which counts to three by the following code:

| 1 | 2 | 4 | 8 | Count | Binary Output |
|---|---|---|---|---|---|
| 0 | 0 | 0 | 0 | 0 | $\bar{1}$ $\bar{2}$—not 1 not 2 |
| 1 | 0 | 0 | 0 | 1 | 1 $\bar{2}$—true 1 not 2 |
| 0 | 1 | 0 | 0 | 2 | $\bar{1}$ 2—not 1 true 2 |
| 1 | 1 | 0 | 0 | 3 | 1 2—true 1 true 2 |

The price entry section or circuit 59 has a capacity of $9.99. The least significant place in the selected price per pound is multiplied by each place in the weight figure using the least significant place first, etc. The price entry circuit includes a bank of nine cents contacts 101, a bank of nine dimes contacts 102, and a bank of nine dollars contacts 103 which are closed by setting price knobs or levers to selected positions. The contacts are in circuit with the respective ones of terminals 1–9 in a diode matrix 73. The AND gate 83 when enabled by an input from a NOT gate 100 and by the two-stage flip flop 61 being in its reset state applies an output to a lead 104 (controls partial product gating not shown) and to the bank of cents contacts 101; the AND gate 84 when enabled by an input from the NOT gate 100 and by the two-stage flip flop 61 being in its count one state applies an output to a lead 105 (controls partial product gating not shown) and to the bank of dimes contacts 102; and the AND gate 85 when enabled by an input from the NOT gate 100 and by the two-stage flip-flop 61 being in its count two state applies an output to a lead 106 (controls partial product gating not shown) and to the bank of dollars contacts 103.

The decimal price entry, e.g., a price of $1.12, would connect a closed contact in the bank 101 to the 2 terminal of the diode matrix 73, a closed contact in the bank 102 to the 1 terminal of the diode matrix 73, and a closed contact in the bank 103 to the 1 terminal of the diode matrix 73, is changed to 1–2–4–8 binary coded decimal by the diode matrix 73. Only one bank of contacts is energized at a time as programmed by the two-stage flip flop 61. When price contacts are closed, output terminals 1, 2, 4 and 8 of the diode matrix 73 apply binary coded decimal inputs to the rest of the computer as shown in the above U.S. application Ser. No. 439,751. Zero places in the price entry are entered by opening all of the contacts in the respective contact banks 101–103.

Figure 2:
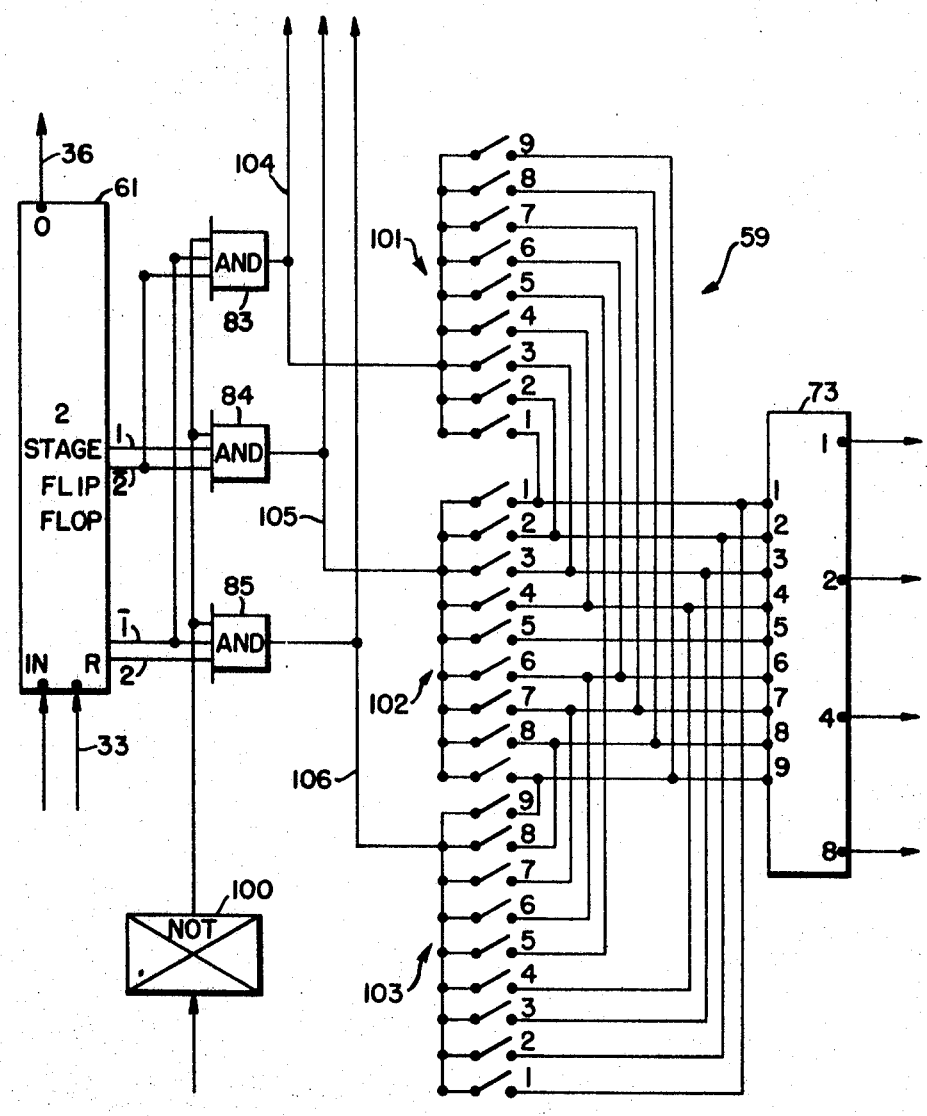
FIG. 2 is a diagram of part of the computer shown in FIG. 1 illustrating the price factor entry section of the computer.

The computer 18 which is disclosed in the above U.S. application Ser. No. 439,751 is modified to have the selected price factors entered into the computer either by the manually operated selector switches 101–103 in a first mode of operation or by novel photosensitive means in a second mode of operation. One modification is shown in FIG. 2, i.e., the NOT gate 100 in circuit with the inputs of the AND gates 83–85 is an added element. The photosensitive means includes four cents photocells 107–110 (FIGS. 3 and 5), four dimes photocells 111–114 and four dollars photocells 115–118. Amplifiers 119 apply the amplified photocell outputs to AND gates 120–131, respectively. The outputs of AND gates 120, 124 and 128 are applied to an OR gate 132; the outputs of AND gates 121, 125 and 129 are applied to an OR gate 133; the outputs of AND gates 122, 126 and 130 are applied to an OR gate 134; and the outputs of AND gates 123, 127 and 131 are applied to an OR gate 135. The outputs of the OR gates 132–135 are applied to the output terminals 1, 2, 4 and 8, respectively, of the diode matrix 73 (FIG. 2) for the application of binary coded decimal price entry inputs to the rest of the computer.

The commodity name printing plate 58 includes a flat body 136 defining an opening 137 and an opening 138 at which a tab 139 is located which is bent up as viewed in FIG. 3 out of the plane of the flat body 136, and carries printing type 140 for printing the commodity name. The flat body 136 also defines two holes 141 and 142 for the reception of legs 147 and 148, respectively, of a cents mask 149, two holes 143 and 144 for the reception of legs 150 and 151, respectively, of a dimes mask 152, and two holes 145 and 146 for the reception of legs 153 and 154, respectively, of a dollars mask 155, and has a handle 156 bent out of its plane. The flat body 136 also defines four cents holes 157–160, four dimes holes 161–164, and four dollars holes 165–168. Photocells 107–118 look at holes 157–168, respectively. The flat body 136 also defines an interlock hole 169. An interlock photocell 170 looks at the hole 169 and an interlock photocell 171 is located at a solid portion of the body member 136 as shown in FIG. 3.

Figure 4:
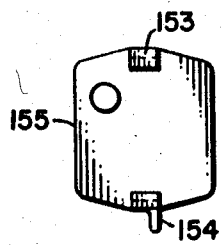
FIG. 4 is a plan view of one of the masks shown in FIG. 3.

The commodity name printing plate 58 except for the holes 141–146 and 157–168 is like the printing plate disclosed in the above U.S. Patent No. 3,334,583 and is secured in the printer disclosed in such patent in the same manner as the prior printing plate is secured in the printer, i.e., by means of two magnets shown in such patent, the hole 137 in the printing plate 58 receiving a finger projecting from the printer and the tab 139 on the printing plate 58 being received in a hole in the printer as an aid in locating the printing plate and keeping it stable. Both printing plates function to print the name of the commodity. The magnets (magnets 166 and FIG. 9 of U.S. Patent No. 3,334,583) are spaced apart and between them in the area shown in FIG. 9 of the patent above the block 161 as viewed in such FIG. 9 are located the fourteen photocells 107–118 and 170–171 in the arrangement shown in FIG. 3. The printing plate 58 is held by the magnets closely juxtaposed to the photocells, the printing plate 58 being located relative to the photocells as shown in FIG. 3 when it is in operative position in the printer. A light source 172 (FIG. 5) is formed by two light bulbs wired in series which are supported in brackets that are not shown but which are mounted from the bar 179 shown in FIG. 4 in the above U.S. Patent No. 3,334,583 so that the light bulbs are juxtaposed to the ticket deflector 165 shown in such FIG. 4 in the patent. When the printing plate 58 is in operative position and when the pivotable frame 142 shown in the above U.S. Patent No. 3,334,583 which carries the photocells 107–118 and 170–171 and the printing plate 58 is in its operative position, the light source 172 illuminates the photocells 107–118 and 170 to activate them through those of the holes 157–169 in the printing plate 58 which are uncovered.

The masks 149, 152 and 155 function to cover selected one of the openings 157–168 in the printing plate 58 in a pattern according to a selected price factor. There are four holes 157–168 for each of the three places in the price and by giving the four holes in each set values of 1–2–4–8, respectively, decimal prices are converted to 1–2–4–8 binary coded decimal values. The legs 147–148, 150–151, and 153–154 of the masks 149, 152 and 155 are spaced apart slightly more than the distance between the holes in the printing plate 58 which receive them so that when they are forced by finger pressure into the holes the masks are held in place. However, the masks can be removed by pulling them away from the printing plate. Holes 142, 144 and 146 and their cooperating mask legs are shaped differently than are the respective holes 141, 143 and 145 and their cooperating legs to ensure proper orientation of the masks. Holes 157–160 correspond, respectively, to 1–2–4–8 binary coded decimal numbers in the cents place and photocells 107–110, accordingly, correspond, respectively, to the 1–2–4–8 binary coded decimal numbers in the cents place; holes 161–164 correspond, respectively, to 1–2–4–8 binary coded decimal numbers in the dimes place and photocells 111–114, accordingly, correspond, respectively, to the 1–2–4–8 binary coded decimal numbers in the dimes place; and holes 165–168 correspond, respectively, to 1–2–4–8 binary coded decimal numbers in the dollars place and photocells 115–118, accordingly, correspond, respectively, to the 1–2–4–8 binary coded decimal numbers in the dollars place. Each of the masks 149, 152 and 155 bears an identifying decimal number (not shown). In order to set up a printing plate 58 to enter a price of $1.27, for example (the price set up depends on the current price per pound of the commodity whose name is to be printed by the printing type 140), the operator clips a 1 mask over holes 165–168 which mask has a hole (1 mask 155 shown in FIG. 4) exposing the hole 165 to produce a 1 binary coded decimal output, clips a 2 mask over holes 161–164 which mask has a hole exposing the hole 162 to produce a 2 binary coded decimal output, and clips a 7 mask over holes 157–160 which mask has three holes exposing the holes 157–159 to produce a 7 binary coded decimal output.

The amplified output of the interlock photocell 170 is applied by an amplifier 173 to an AND gate 174 and the amplified output of the interlock photocell 171 is applied by an amplifier 175 to a NOT gate 176 having its output applied to an input of the AND gate 174. The output of the AND gate 174 is applied to inputs of AND gates 177–179 and to the input of the NOT gate 100 (FIG. 2) and through a lead 180 (FIG. 5) to a capacitor 181 connecting the lead to the input of an AND gate 182.

The mode of operation is selected automatically by the type of commodity name printing plate inserted in the mechanical readout and printer 39. When the commodity name printing plate disclosed in the above U.S. Patent No. 3,334,583 is in operative position in the printer (the plate is like plate 58 except it has no holes 141–146 and 157–168), the interlock photocells 170 and 171 are covered up by the plate preventing illumination of the photocells by the light source 172. Photocell 171 being dark partially enables the AND gate 174 because the signal is inverted by the NOT gate 176, but the partially enabled AND gate 174 is not completely enabled because the dark photocell 170 applies no input to the AND gate 174. Hence, the AND gate 174 is off and it applies no enabling signal to the AND gates 177–179. However, the signal is inverted by the NOT gate 100 (FIG. 2) which applies an enabling signal to the AND gates 83–85 to automatically select the mode of operation wherein the price switches 101–103 are used to enter the selected price into the computer. As described in the above U.S. application Ser. No. 439,751, the AND gate 83 is enabled by the $\bar{1}$ and $\bar{2}$ outputs of the reset flip flop 61 (FIG. 2) to select the cents place in the price per pound to be multiplied first (price entry produces the 1–2–4–8 binary coded decimal output from the diode matrix 73). Then the AND gate 84 is enabled by the $\bar{2}$ and $\bar{1}$ outputs of the flip flop 61 to select the dimes place in the price per pound to be multiplied next and then the AND gate 85 is enabled by the $\bar{2}$ and $\bar{1}$ outputs of the flip flop 61 to select the dollars place in the price per pound to be multiplied next. Accordingly, when the commodity name printing plate disclosed in the above U.S. Patent No. 3,334,583 is in operative position in the printer, price entry is accomplished as disclosed in such patent.

When commodity name printing plate 58 (FIGS. 3 and 5) is in operative position in the printer, the interlock hole 169 exposes the interlock photocell 170 to light from the light source 172 and the plate masks the interlock photocell 171 from such light. Photocell 171 being dark partially enables the AND gate 174 as described above and photocell 170 being light completely enables the AND gate 174. The AND gate 174 being on applies an enabling signal to the AND gates 177–179 which enabling signal is not applied to the AND gates 83–85 because of the NOT gate 100. The AND gates 177–179 are completely enabled by the same respective outputs from the flip flop 61 as are the AND gates 83–85 as indicated at the input leads to the AND gates 177–179 in FIG. 5 to select the places in the price per pound to be multiplied one at a time (partial products). Enabled cents AND gate 177 enables cents AND gates 120–122 (partially enabled by 1–2–4–8 binary coded decimal signals from the photocells 107–110) which apply inputs to the OR gates 132–135 that have their outputs connected to the 1, 2, 4 and 8 output terminals of the diode matrix 73 (FIG. 2) to enter the cents place in the price entry into the computer by photosensitve means controlled by the printing plate 58 and applies an output to the lead 104 described above. This eliminates the chance of operator's mistakes in entering the price through the switches 101–103. Once the supervisor has set up the correct price on the printing plate 58 by clipping on the masks, the action of the operator in putting a "hamburg" printing plate in the printer, for example, sets up the correct "hamburg" price per pound in the computer. Enabled dimes AND gate 178 enables dimes AND gates 124–127 (partially enabled by 1–2–4–8 binary coded decimal signals from the photocells 111–114) which apply inputs to the OR gates 132–135 to enter the dimes place in the price entry into the computer by the photosensitive means and applies an output to the lead 105 described above. Enabled dollars AND gate 179 enables dollars AND gates 128–131 (partially enabled by 1–2–4–8 binary coded decimal signals from the photocells 115–118) which apply inputs to the OR gates 132–135 to enter the dollars place in the price entry into the computer by the photosensitive means and applies an output to the lead 106 described above.

The mode of operation also is selected automatically by whether or not a commodity name printing plate is in operative position in the printer (safety interlock). In the absence of a printing plate, both of the interlock photocells 170 and 171 are exposed to light from the source 172. Photocell 170 being light partially enables the AND gate 174, but the AND gate 174 is not completely enabled because the signal from the illuminated photocell 171 is inverted by the NOT gate 176. Accordingly, the AND gate 174 is off. As described above, when the AND gate 174 is off, the NOT gate 100 applies an enabling signal to the AND gates 83–85 to automatically select the mode of operation wherein the price switches 101–103 are used to enter the selected price into the computer.

The ouput of the AND gate 182 is connected to the input of the AND gate shown in the above U.S. Patent No. 3,384,193 (AND gate 67 in the patent), which has its output connected to the "IN" terminal of the two-input flip flop 54 shown in the patent, through the switches 69, 68, 71 and 207 shown in the patent (AND gate 67, flip-flop 54, switches 69, 68, 71 and 207 are part of the programmer 30 FIGS. 1 and 5). As described in such U.S. Patent No. 3,384,193, and interruption of the signal applied through the switches 68 and 69 shown in the patent to the AND gate 67 shown in the patent prevents advance of the programmer 30 or interrupts the program by resetting the programmer 30. Similarly, since the output of the AND gate 182 (FIG. 5) is applied as an input to the programmer 30 through the above existing circuitry, the turning off of the AND gate 182 prevents advance of the programmer 30 or interrupts the program by resetting the programmer 30.

In addition to the features of entering the selected price factor by novel photosensitive means, automatic selection of the mode of operation by whether or not a printing plate is in the printer and by which type of printing plate is in the printer, and control of the photosensitive means by a plate which also prints the commodity name as described above, there is an additional feature of preventing or interrupting computing if the light source 172 fails. Failure of the light source 172 when the plate 58 is in the printer causes the interlock photocell 170 to go dark. As described above, when both of the interlock photocells 170 and 171 are not illuminated, the AND gate 174 is off. This puts the system automatically into the mode wherein the price switches 101–103 are used to enter price as described above and also produces a change in the sign of the signal applied through the lead 180 to the capacitor 181 from plus to minus. The change from plus to minus causes the capacitor 181 to turn the AND gate 182 off momentarily by drawing a current spike through a resistor 184 connected to a positive voltage source. Thereafter, the minus signal applied by the lead 180 to the capacitor 181 does not affect the AND gate 182. Positive signal applied through a lead 183 and the resistor 184 then reenable the AND gate 182. However, the momentary turning off of the AND gate 182 prevents advance of the programmer 30 or interrupts the program of the programmer 30 as described above, i.e., the interlock prevents or interrupts computing if the light source 172 fails.

The capacity of the computer 18 to accept a price entry is $9.99 which is the capacity of the switches 101–103 (FIG. 2). However, a malfunction in the photosensitive means or in its printing plate control for entering price might result in an attempt to enter a place in the selected price factor in excess of nine. As a protection against such an excess price entry, AND gates 185–190, OR gate 191, and NOT gate 192 are provided. The AND gate 185 receives the 2–8 binary coded decimal outputs (decimal 10) from the cents photocells 108 and 110 and the AND gate 186 also receives such 8 output from the photocell 110 and receives the 4 binary coded decimal output (decimal 12) from the cents photocell 109. Accordingly, any attempt to enter a number ten or larger in the cents place results in enabling AND gate 185 or 186. Similarly, AND gates 187 and 188 receive 2–8 and 8–4 binary coded decimal outputs from the respective dimes photocells and AND gates 189 and 190 receive 2–8 and 8–4 binary coded decimal outputs from the respective dollars photocells. Accordingly, any attempt to enter a number ten or larger in the dimes or dollars place results in enabling the respective AND gates 187–190. The enabling of any one of the AND gates 185–190 results in an input signal to the OR gate 191 whose plus output signal is inverted to a minus signal by the NOT gate 192 and applied through a lead 193 to a point 194 in the circuit between the capacitor 181 and the AND gate 182. As long as point 194 is held negative, the AND gate 182 is closed. As described above, when the AND gate 182 is closed, advance of the programmer 30 is prevented or the program of the programmer 30 is interrupted, i.e., the interlock prevents or interrupts computing if the photosensitive means attempts to set up a place in the selected price factor in excess of a predetermined number.

It is to be understood that the above description is illustrative of this invention and that various modifications thereof can be utilized without departing from its spirit and scope.

Having described the invention, I claim:

1. A computing weighing scale comprising, in combination, a computer for computing the value of a commodity according to its weight factor and a selected price factor, means for setting up the weight factor in the computer, manually operated switch means for setting up the selected price factor in the computer in a first mode of operation, photosensitive means for setting up the selected price factor in the computer in a second mode of operation, light source means for activating the photosensitive means, and interlock means operable only in said second mode of operation if the light source means fails for preventing or interrupting computing, whereby computing may be continued in said first mode of operation.

2. A computing weighing scale comprising, in combination, a computer for computing the value of a commodity according to its weight factor and a selected price factor, means for setting up the weight factor in the computer, photosensitive means for setting up the selected price factor in the computer, and interlock means for preventing or interrupting computing if the photosensitive means attempts to set up a place in the selected price factor in excess of a predetermined number.

3. A computing weighing scale comprising, in combination, a computer for computing the value of a commodity according to its weight factor and a selected price factor, means for setting up the weight factor in the computer, manually operated switch means for setting up the selected price factor in the computer in a first mode of operation, photosensitive means for setting up the selected price factor in the computer in a second mode of operation, and printing plate means for both selecting the mode of operation and printing the commodity name.

4. A computing weighing scale according to claim 3 wherein the printing plate means also is for controlling the photosensitive means in accordance with the selected price factor.

5. A computing weighing scale according to claim 3 wherein interlock means are provided for selecting the first mode of operation automatically in the absence of said printing plate means.

6. A computing weighing scale comprising, in combination, a computer for computing the value of a commodity according to its weight factor and a selected price factor, means for setting up the weight factor in the computer, manually operated switch means for setting up the selected price factor in the computer in a first mode of operation, photosensitive means for setting up the selected price factor in the computer in a second mode of operation, light source means for activating the photosensitive means, and interlock means for selecting the first mode of operation automatically if the light source means fails.

7. A computing weighing scale comprising, in combination, a computer for computing the value of a commodity according to its weight factor and a selected price factor, means for setting up the weight factor in the computer, photosensitive means for setting up the selected price factor in the computer, light source means for activating the photosensitive means, a printing plate defining openings, means for covering selected openings in a pattern according to the selected price factor, the printing plate masking the photosensitive means from the light source according to said pattern to control the photosensitive means and also printing the commodity name, and interlock means for preventing or interrupting computing if the photosensitive means attempts to set up a place in the selected price factor in excess of a predetermined number.

8. A computing weighing scale comprising, in combination, a computer for computing the value of a commodity according to its weight factor and a selected price factor, means for setting up the weight factor in the computer, manually operated switch means for setting up the selected price factor in the computer in a first mode of operation, photosensitive means for setting up the selected price factor in the computer in a second mode of operation, light source means for activating the photosensitive means, a printing plate defining openings, means for covering selected openings in a pattern according to the selected price factor, the printing plate masking the photosensitive means from the light source according to said pattern to control the photosensitive means and also printing the commodity name, and interlock means operable in said second mode of operation in the absence of said printing plate for preventing or interrupting computing whereby computing may be continued in said first mode of operation.

References Cited

UNITED STATES PATENTS 2,693,734  11/1954  Coleman et al.
3,145,792  8/1964  Bell _____ 177—4

RICHARD B. WILKINSON, Primary Examiner

GEORGE H. MILLER, Jr., Assistant Examiner

U.S. Cl. X.R.
235—58, 61